US 11,393,303 B2

(12) United States Patent
Gonzalez et al.

(10) Patent No.: US 11,393,303 B2
(45) Date of Patent: Jul. 19, 2022

(54) SMART CABIN CARPET

(71) Applicant: Koninklijke Fabriek Inventum B.V., Nieuwegein (NL)

(72) Inventors: Arnau Castillo Gonzalez, Maarssen (NL); Hans Huijsing, Ijsselstein (NL)

(73) Assignee: Koninklijke Fabriek Inventum B.V., Nieuwegein (NL)

(*) Notice: Subject to any disclaimer, the term of this patent is extended or adjusted under 35 U.S.C. 154(b) by 0 days.

(21) Appl. No.: 17/217,540

(22) Filed: Mar. 30, 2021

(65) Prior Publication Data
US 2021/0358275 A1 Nov. 18, 2021

Related U.S. Application Data

(60) Provisional application No. 63/023,491, filed on May 12, 2020.

(51) Int. Cl.
G08B 5/36 (2006.01)
B64C 1/18 (2006.01)
G01V 3/08 (2006.01)

(52) U.S. Cl.
CPC .......... G08B 5/36 (2013.01); B64C 1/18 (2013.01); G01V 3/08 (2013.01)

(58) Field of Classification Search
CPC ... G08B 5/36; B64C 1/18; G01V 3/08; B64D 2011/0038; B64D 2203/00
See application file for complete search history.

(56) References Cited

U.S. PATENT DOCUMENTS

| 4,746,308 | A | 5/1988 | Mutte |
| 7,316,838 | B2 * | 1/2008 | Aisenbrey ........... B29C 45/0013 428/95 |
| 9,312,598 | B1 * | 4/2016 | Callas .................. H01Q 21/28 |
| 10,496,953 | B1 * | 12/2019 | Hahn ..................... H04L 67/22 |
| 10,856,810 | B2 | 12/2020 | Najafi et al. |
| 2010/0314946 | A1 | 12/2010 | Budde et al. |
| 2011/0027520 | A1 | 2/2011 | Lauterbach et al. |

FOREIGN PATENT DOCUMENTS

| EP | 0341554 A1 | 11/1989 |
| EP | 0311930 B1 | 6/1992 |
| EP | 2028466 A4 | 1/2012 |
| EP | 3543121 A1 | 9/2019 |
| EP | 3755832 A1 | 12/2020 |

(Continued)

OTHER PUBLICATIONS

EP Search Report for European Application No. 21173590.7 dated Sep. 21, 2021, 7 pages.

Primary Examiner — John A Tweel, Jr.
(74) Attorney, Agent, or Firm — Suiter Swantz pc llo

(57) ABSTRACT

A system for monitoring traffic in aircraft cabins includes conductive wire in aisle carpeting and sensors to register pressure via capacitance changes. The system identifies the volume and location of traffic in aircraft aisles via registered changes to voltage, current, and/or conductivity of the conductive wire, and sensors embedded in the carpet. Measurements over time establish changes in traffic flow and directionality which may be used to direct crew members in flight. Lighting elements may be incorporated into the carpet to provide signals to passengers and crew via the lighting elements.

11 Claims, 4 Drawing Sheets

(56) References Cited

FOREIGN PATENT DOCUMENTS

| | | | |
|---|---|---|---|
| ES | 1224574 | Y1 | 4/2019 |
| GB | 1527192 | A | 10/1978 |
| GB | 1585575 | A | 3/1981 |
| IN | 293611 | B | 5/2009 |
| JP | 1990126811 | A | 7/1993 |
| WO | 2005015427 | A1 | 2/2005 |
| WO | WO-2005015427 | A1 * | 2/2005 ........... G08B 25/009 |
| WO | 2019193534 | A3 | 11/2019 |
| WO | 2020074923 | A1 | 4/2020 |
| WO | 2021053616 | A1 | 3/2021 |

* cited by examiner

SMART CABIN CARPET

PRIORITY

The present application claims the benefit under 35 U.S.C. § 119(e) of U.S. Provisional App. No. 63/023,491 (filed May 12, 2020), which is incorporated herein by reference.

BACKGROUND

Space for movement in aircraft cabins is highly restricted. Different phases of a flight require significant choreography of crew members, trolleys, and passengers in the cabin to improve cabin flow. Such choreography requires real time data about the state of movement in the cabin.

SUMMARY

In one aspect, embodiments of the inventive concepts disclosed herein are directed to a system for monitoring traffic in aircraft cabins via conductive wire in aisle carpeting and sensors to register pressure via capacitance changes. The system identifies the volume and location of traffic in aircraft aisles via registered changes to voltage, current, and/or conductivity of the conductive wire, and sensors embedded in the carpet.

In a further aspect, measurements over time establish changes in traffic flow and directionality which may be used to direct crew members in flight.

In a further aspect, lighting elements are incorporated into the carpet. Information derived from the conductive wires and sensors may be used to provide signals to passengers and crew via the lighting elements.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
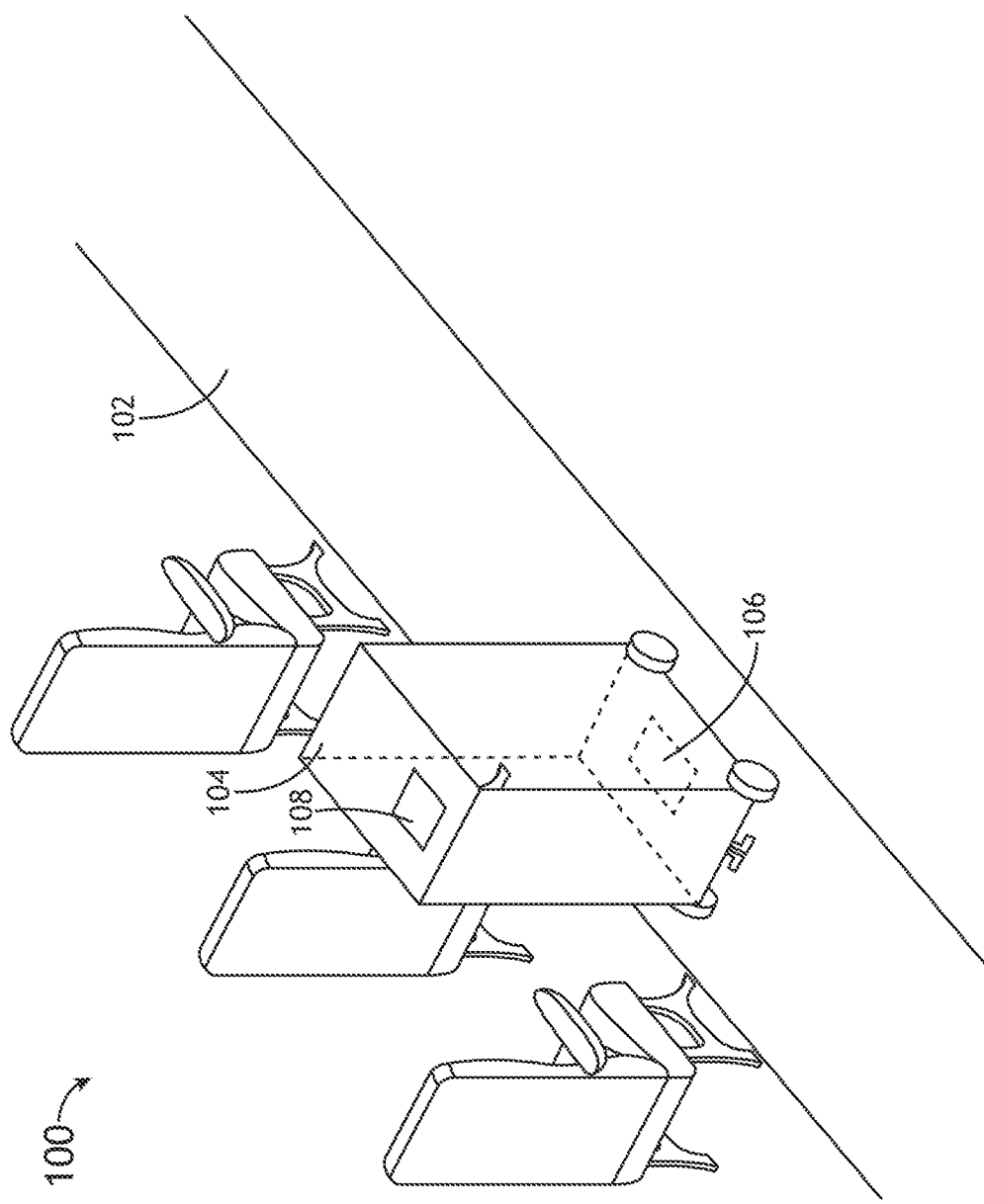
FIG. 1 shows an environmental view of an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a , 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for monitoring traffic in aircraft cabins via conductive wire in isle carpeting. The system identifies the volume and location of traffic in aircraft isles via registered changes to voltage, current, and/or conductivity of the conductive wire.

Referring to FIG. 1, an environmental view of an aircraft cabin 100 including an exemplary embodiment is shown. The aircraft cabin 100 includes a carpet 102 including conductive wire connected to a processor/controller. In at least one embodiment, the conductive wire is configured as detection loops for detecting items in the cabin 100 and communicating via magnetic fields. Alternatively, or in addition, the loops may detect disturbances in a magnetic field established by an input signal to the loops as moving objects transit nearby. In at least one embodiment, the conductive wires may be used to locate trolleys 104 in the cabin aisle, in real-time. Trolleys 104 may include radio frequency identification tags (RFID) 106 disposed on a surface of the trolley 104 proximal to the carpet 102. As RFID tags 106 are detected by the conductive wire, the controller/processor may track the location of the trolley 104 over time to manage traffic.

In at least one embodiment, disturbances to magnetic fields and registration of RFID tags are used to track the location of specific on-board equipment. Furthermore, by referencing other on-board systems, the processor/controller may correlate equipment location with list of equipment contents. Crew members may thereby search for needed materials and be directed to the nearest source of materials.

In at least one embodiment, the conductive wire may identify foot traffic via alterations in output signal voltage, current, frequency domain impedance, etc. Traffic flows may be used to predict aisle usage. Furthermore, integrated sensors may detect foot traffic and communicate such events to controller/processor via the conductive wire. Such sensors may comprise pressure sensors configured to register pressure changes via changes in capacitance. In at least one embodiment, passengers may be distinguished from crew members via an RFID tag.

In at least one embodiment, the controller/processor may send and receive data packets to and from the trolley 104 via near field communication through the conductive wire. In at least one embodiment, such data packets may be managed from a data communication element 108 disposed in the trolley 104.

In at least one embodiment, the controller/processor is configured to detect ferrous metallic objects in the aisle via the conductive wire, and register movement and final location. For example, the conductive wire may be used to determine when all passengers are seated via a threshold time of no detected movement.

In at least one embodiment, the controller/processor may communicate with a crew station to display trolley 104 locations and passenger status based on signals from the conductive wire.

Figure 2:
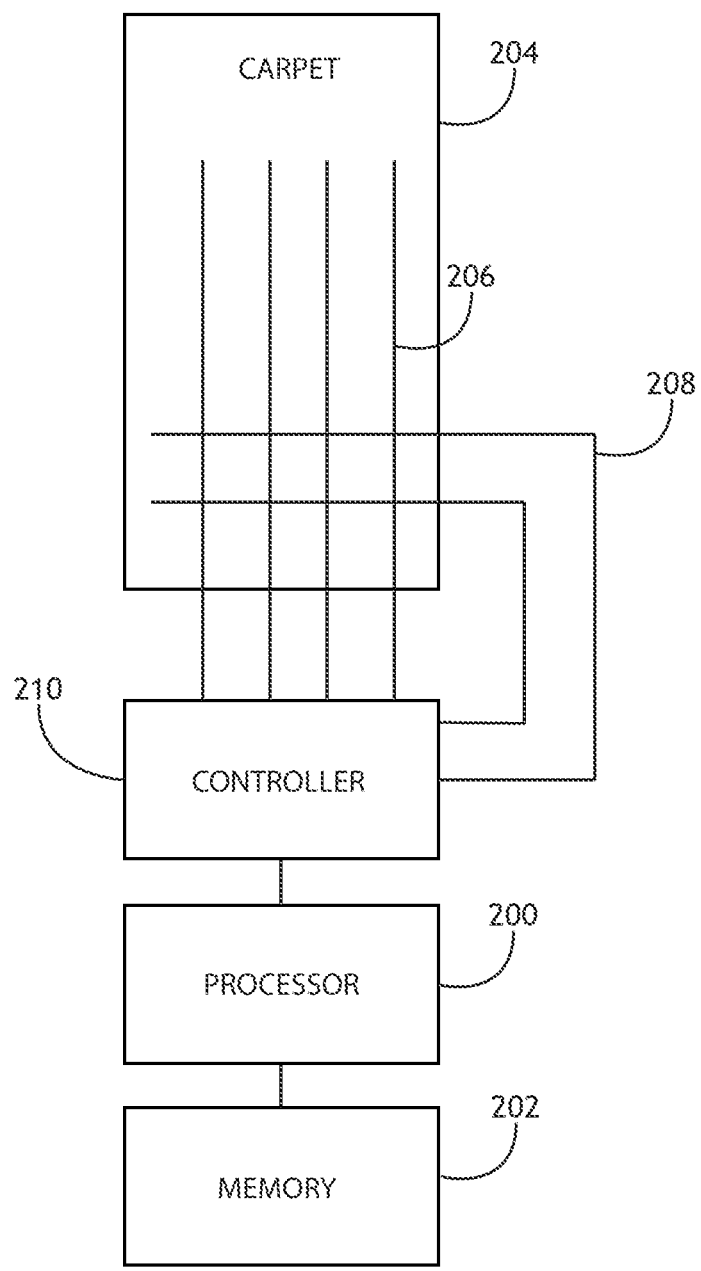
FIG. 2 shows a block diagram of a system according to an exemplary embodiment.

Referring to FIG. 2, a block diagram of a system according to an exemplary embodiment is shown. The system includes a processor 200, memory 202 connected to the processor 200 for embodying processor executable code, and a carpet 204 including a plurality of conductive wires 206, 208.

In at least one embodiment, the processor 200 applies input signals to the conductive wires 206, 208; the input signals are modified, for example by changing the voltage, frequency, frequency domain impedance, etc. The modified signals are received by the processor 200 and analyzed to identify corresponding cabin aisle events. In at least one embodiment, output signals may indicate the location and progress of one or more trolleys in the cabin. Likewise, the output signals may indicate foot traffic.

In at least one embodiment, each of the conductive wires 206, 208 may be configured with loops to interact with near field communication elements disposed on trolleys operating in the cabin. Input signals may be multiplexed to facilitate distinguishing which loops are interacting with the near field communication elements.

In at least one embodiment, the carpet 204 may include a first set of conductive wires 206 running along a first axis and a second set of conductive wires 208 running along a second axis. Conductive wires 206, 208 on separate axes may facilitate distinguishing output signals and the cabin events that produced them. Furthermore, changes to output signals over time may be used to track cabin events.

In at least one embodiment, the processor 200 may execute a trained neural network to analyze output signals.

In at least one embodiment, the system includes a controller 210 specifically configured to apply signals to the conductive wires 206, 208 and receive output signals from the conductive wires 206, 208. The controller 210 may then communicate such data to the processor 200.

Embodiments of a system having a processor 200 and carpet 204 with conductive wires 206, 208 (including loops for registering magnetic interactions), sensors, and light sources may be operated in different modes according to factors such as phases of a flight. For example, in one mode, the system may track and direct passengers boarding and leaving the aircraft; in another mode, the system may track the locations of crew members and equipment, orchestrating the movement of crew members and equipment to enhance efficiency.

In may be appreciated that data communication between the processor, 200, controller 210, and conductive wires 206, 208 may be via wired connection or wireless communication where applicable.

Figure 3:
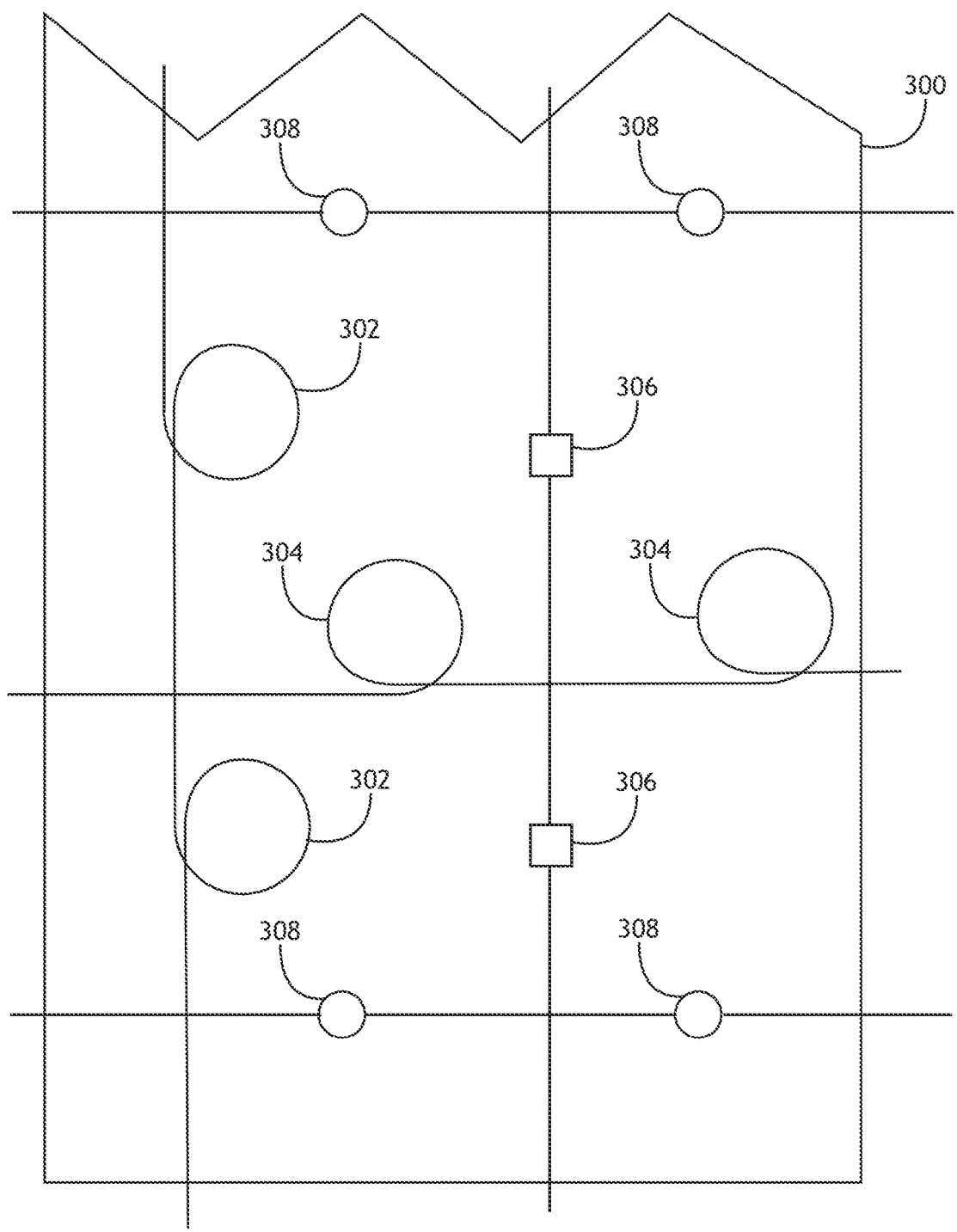
FIG. 3 shows a block diagram of a carpet with conductive wire according to an exemplary embodiment.

Referring to FIG. 3, a block diagram of a carpet 300 with conductive wire according to an exemplary embodiment is shown. The conductive wire may be organized into loops 302, 304. The loops 302, 304 may be various sizes or number of turns as dictated by input signals to facilitate near field communication, including with RFID tags. Furthermore, the size of the loops 302, 304 and numbers of windings may impact the output signals in a predictable way to facilitate distinguishing the type and location of traffic along the conductive wire.

In at least one embodiment, a first set of loops 302 may be disposed in locations separate from a second set of loops 304 to prevent overlap and facilitate distinct output signals which may be combined by a processor to determine a more accurate estimation of cabin traffic.

In at least one embodiment, the carpet 300 may comprise sensors 306 disposed periodically to detect pressure and/or capacitance changes. The sensors 306 may be disposed along conductive wires that also include loops 302, 304. Alternatively, or in addition, the sensors 306 may be interleaved between loops 302, 304 on the conductive wires.

In at least one embodiment, the carpet 300 may include light sources 308 such as light emitting diodes (LEDs). The light sources 308 may be disposed along conductive wires that also include loops 302, 304 and/or sensors 306. Alternatively, or in addition, the light sources 308 may be interleaved between loops 302, 304 and/or sensors 306 on the conductive wires. Such light sources 308 may be used in conjunction with equipment tracking functionality enabled by the loops 302, 304 and sensors 306 to produce direction aides on the carpet 300 leading crew members to the nearest known location of requested materials; for example, where a trolley is out of some desired resource, the crew member may search for that resource and be directed to the location of the nearest source via a lighted path in the carpet 300.

Figure 4:
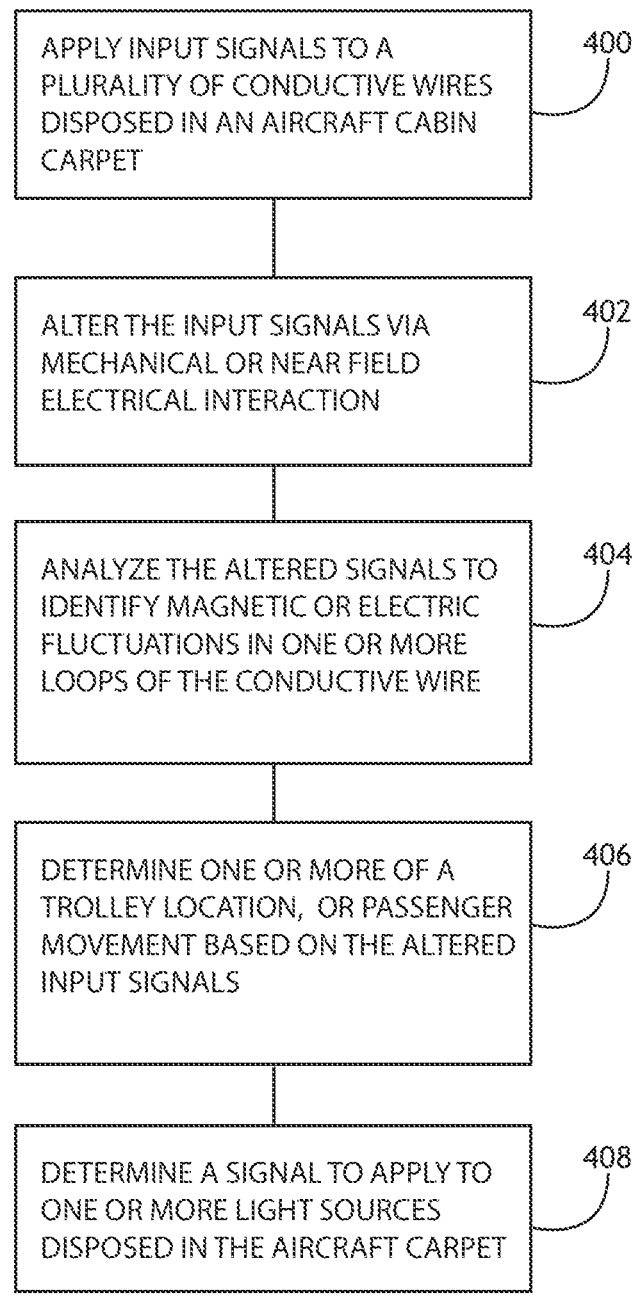
FIG. 4 shows a flowchart of a method according to an exemplary embodiment.

Referring to FIG. 4, a flowchart of a method according to an exemplary embodiment is shown. A controller/processor applies 400 input signals to a plurality of conductive wires woven into an aircraft cabin carpet. The conductive wires comprise loops for producing magnetic fields for interaction with near field communication devices or detecting disturbances in a magnetic field. The input signals are altered 402 by mechanical or near field electrical interaction to produce output signals.

The output signals are analyzed 404 to identify magnetic fluctuations (caused by near field interactions with loops in the conductive wire) or electric fluctuations (caused by mechanical changes to the conductive wire). In at least one embodiment, the controller/processor may receive output signals from one or more sensors disposed in the carpet. Such analysis may be by algorithms associating signal fluctuations to known properties of various loops in the conductive wire.

Based on the output signals, the controller/processor determines 406 one or more cabin events such as the location of a trolley and/or the movement of passengers. In at least one embodiment, output signals may be recorded and analyzed over time. Data packets may be sent and received to and from in cabin trolleys via near field communication through the conductive wire loops.

Based on the identified cabin events, the controller/processor may apply 408 signals to one or more light sources disposed in the aircraft carpet. For example, the controller/processor may determine that passengers are closer than some predetermined distance from each other and apply signals to the light sources to provide a visual aide for preferred distancing. Such visual aide may be by color coding, rendered arrows, etc. Furthermore, the controller/processor may apply signals to the light sources according to different phases of flight. For example, during initial and final phases of flight, when passengers are expected to be seated, the controller/processor may determine with reference to the conductive wires and sensors that one or more passengers are not seated; the controller/processor may apply signals to the light sources to create a visual aide or instruction to those specific passengers. Likewise, during a phase of flight where meals are being served, the controller/processor may determine the seating assignments of passengers requesting special meals with reference to an on-board database. The controller/processor may then apply signals to the light sources to provide a visual aide for crew members delivering those meals. Also, the controller/processor may determine when a crew signaling event has occurred with reference to an on-board database and apply signals to the light sources to provide an aide to crewmembers by indicating the specific aisle corresponding to the crew signaling event, including a path indicator.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A system comprising:
    a carpet fabric having conductive wire, a plurality of sensors disposed periodically, and a plurality of light emitting diodes (LEDs) disposed periodically;
    at least one processor in data communication with the conductive wire, the plurality of sensors, the plurality of LEDs, and a memory storing processor executable code for configuring the at least one processor to:
    continuously apply one or more input signals to the conductive wire;
    continuously monitor one or more output signals of the conductive wire and from the plurality of sensors;
    identify one or more traffic events based on the output signals by identifying locations of two or more aircraft passengers via the output signals from the plurality of sensors;
    determine that the two or more passengers are less than a predetermined distance from each other; and
    apply signals to the plurality of LEDs to provide a visual aide for maintaining the predetermined distance.

2. The system of claim 1, wherein the at least one processor is further configured to continuously display identified traffic events at a crew monitor station.

3. The system of claim 1, wherein identifying one or more traffic events comprises processing the output signals via a trained neural network.

4. The system of claim 1, wherein the conductive wire comprises a plurality of loops configured to interact with radio frequency identification tags.

5. The system of claim 4, further comprising at least one trolley comprising one or more radio frequency identification tags disposed on a surface proximal to the conductive wire when the trolley is in an aisle.

6. An aircraft comprising:
    a carpet fabric having conductive wire, a plurality of sensors disposed periodically, and a plurality of light emitting diodes (LEDs) disposed periodically;
    a data storage element;
    at least one processor in data communication with, the plurality of sensors, the plurality of LEDs, the conductive wire, the data storage element, and a memory storing processor executable code for configuring the at least one processor to:
    continuously apply one or more input signals to the conductive wire;
    continuously monitor one or more output signals of the conductive wire and from the plurality of sensors;
    identify one or more traffic events based on the output signals by identifying locations of two or more aircraft passengers via the output signals from the plurality of sensors;
    determine that the two or more passengers are less than a predetermined distance from each other;
    apply signals to the plurality of LEDs to provide a visual aide for maintaining the predetermined distance; and
    continuously record the identified traffic events on the data storage element.

7. The aircraft of claim 6, wherein the at least one processor is further configured to:
    receive a request for a location of a resource;
    identify an on-board storage device containing the resource with reference to a separate database; and
    locate the on-board storage device based on the recoded identified traffic events.

8. The aircraft of claim 6, wherein identifying one or more traffic events comprises identifying a disturbance in a magnetic field produced by the conductive wire.

9. The aircraft of claim 6, wherein the conductive wire comprises a plurality of loops configured to interact with radio frequency identification tags.

10. The aircraft of claim 9, further comprising at least one trolley comprising one or more radio frequency identification tags disposed on a surface proximal to the conductive wire when the trolley is in an aisle.

11. The aircraft of claim 10, wherein:
the at least one processor is further configured to send one or more data packets to the at least one trolley via the conductive wire; and
the at least one trolley is configured to receive one or more data packets via the conductive wire.

\* \* \* \* \*